Dec. 23, 1969　　　　　L. VECCHIO　　　　　3,485,015
EXHAUST GAS SCRUBBER
Filed March 28, 1966　　　　　　　　　　　　4 Sheets-Sheet 1

INVENTOR.
LUIGI VECCHIO
BY C. E. Stratton
ATTORNEY

Dec. 23, 1969 L. VECCHIO 3,485,015
EXHAUST GAS SCRUBBER
Filed March 28, 1966 4 Sheets-Sheet 3

INVENTOR.
LUIGI VECCHIO
BY
ATTORNEYS.

INVENTOR.
LUIGI VECCHIO
BY
ATTORNEYS.

United States Patent Office 3,485,015
Patented Dec. 23, 1969

3,485,015
EXHAUST GAS SCRUBBER
Luigi Vecchio, 6003 Fair Ave.,
North Hollywood, Calif. 91606
Continuation-in-part of application Ser. No. 324,386,
Nov. 18, 1963. This application Mar. 28, 1966, Ser.
No. 544,644
Int. Cl. B01d 47/12, 47/02
U.S. Cl. 55—227                             8 Claims

---

An exhaust gas scrubber having a housing containing a plurality of chambers. Inlet means introduces exhaust gas into at least one of said chambers. The exhaust gas passes through several chambers containing a fume-scrubbing liquid whereupon it is discharged through an outlet to the atmosphere. The inlet means includes means for dividing the exhaust fumes into a plurality of paths, each containing separate fume-scrubbing chambers, and means is provided adjacent the outlet for recombining the divided flows.

---

This application is a continuation-in-part of my copending application Ser. No. 324,386, filed Nov. 18, 1963, now abandoned.

This invention relates to apparatus for scrubbing, purifying and otherwise dissipating the noxious portions of exhaust fumes of internal combustion engines, especially in automotive vehicles, for the purpose of reducing the toxic or lethal character thereof, thereby rendering the same safe for human inhalation.

Scrubbing devices for purifying the exhaust fumes of internal combustion engines, as known in the prior art, have been plagued with the problem of an excessive loss of scrubbing liquid under the pressure of tthe exhaust fumes from the internal combustion engine at high speeds. While these scrubbing devices may adequately scrub the exhaust fumes at low pressures, there are none that I am aware of that will operate efficiently at the high velocities attained on super highways and the high pressures built up in the exhaust system by the internal combustion engine at highway speeds. An additional problem found in the prior art is that of adequately testing the scrubbing device for the efficiency of the scrubbing fluids therein. In times past expert chemists have been needed to test the scrubbing liquids within the scrubbing apparatus.

An object of the present invention is to provide fumes-purifying apparatus which will operate efficiently at high pressures and highway velocities without a significant loss of scrubbing fluids therefrom.

Another object of the invention is to provide apparatus that visually indicates the effectiveness of the scrubbing liquids in a simple and effective manner.

The fume-scrubbing apparatus of the present invention generally comprises a housing having a plurality of chambers each forming at least one liquid bath therein. A baffle means is provided to receive and divert the direction of the scrubbed fumes, said baffle means being constructed in such a manner so as to reduce the escape of liquid from the scrubbing means. Means may be provided whereby the exhaust fumes from the internal combustion engine may be divided by a manifold or by a dividing chamber whereby separate paths for the exhaust fumes are developed, each of said paths having separate scrubbing means.

The apparatus may further include an inspection device for determining the effectiveness of the scrubber. Said inspection device generally comprises means for dividing the scrubbed gasses into a main flow and a sample flow. The main flow passes through the outlet of the apparatus, while the sample flow is diverted into the inspection device. The inspection device also includes an additional liquid bath. A glass window is so positioned so as to view the liquid within the last-named liquid bath. Under normal conditions, that is when the scrubbing device is properly working, the liquid in the inspection bath is generally clear. However, should the efficiency of the scrubbing device fall to such a low point that noxious fumes are being exhausted therefrom, the liquid in the inspection bath, which receives a portion of the fumes from the scrubber apparatus, turns dark or otherwise changes its color or clarity, because it will acquire impurities which were passed by the first bath. Thus, by a mere casual observation of the liquid within the inspection bath, one may readily determine the effectiveness of the scrubber apparatus to remove noxious odors from the exhaust fumes.

The above and other features of this invention will be fully understood from the following detailed description and the accompanying drawings in which.

Figure 1:
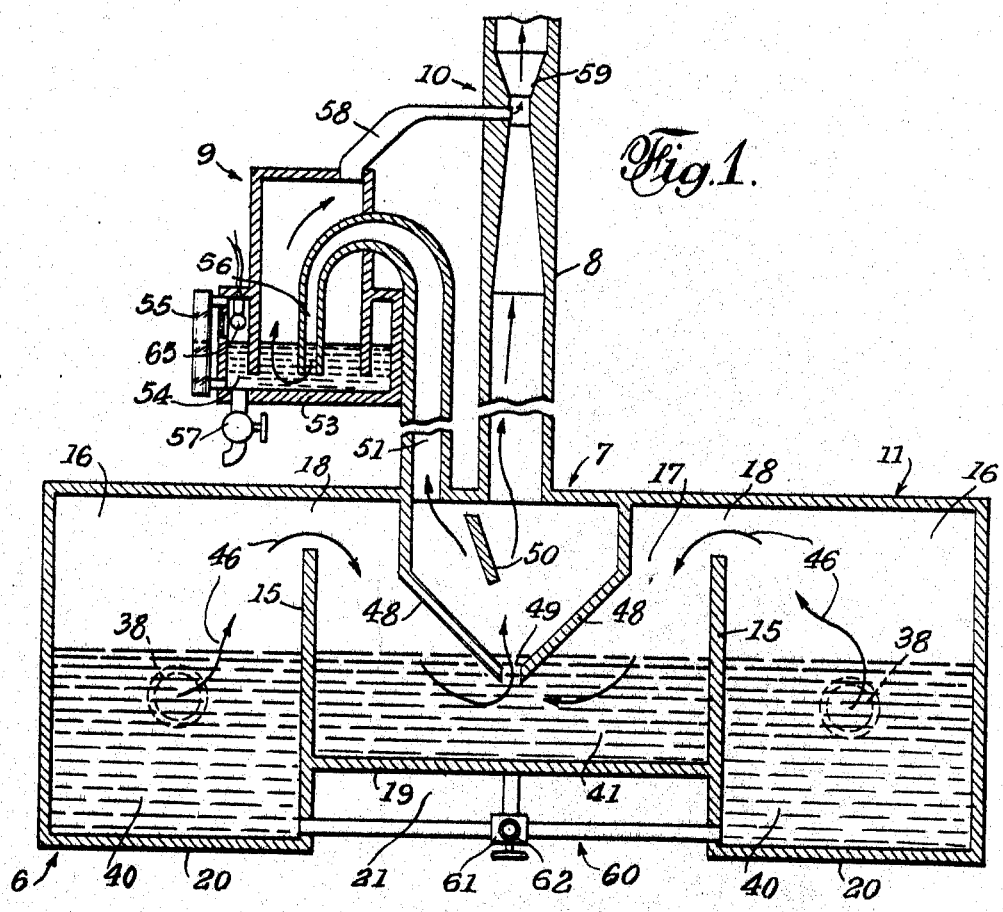
FIG. 1 is a broken cross-sectional view of one form of fumes-purifying apparatus provided with means to indicate the purifying character of the purifying liquid used in the apparatus.

The apparatus that is illustrated comprises, generally, a fumes inlet 5, fumes-scrubbing means 6, baffle means 7 through which scrubbed fumes pass, an outlet 8 to atmosphere from the baffle means 7, means 9 to receive a portion of the scrubbed fumes to show or indicate the effectiveness of scrubbing means 6, and means 10 providing for conduction of said portion of the fumes to the outlet 8.

Figure 2:
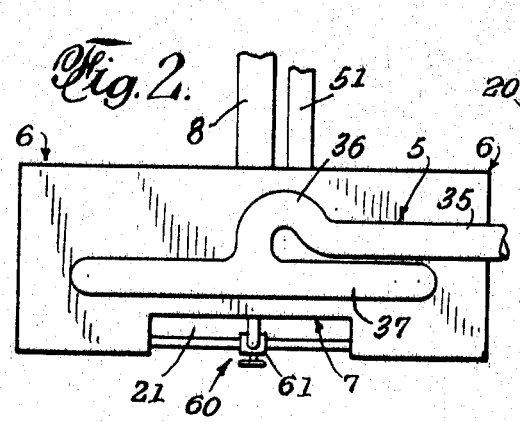
FIG. 2 is a rear elevational view of FIG. 1 drawn to a reduced scale.
Figure 3:
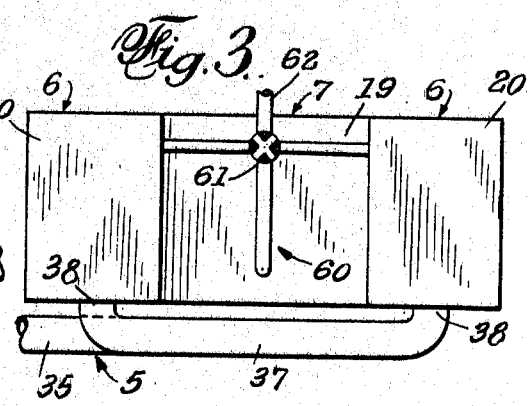
FIG. 3 is a bottom view of FIG. 1 to the same scale.
Figure 4:
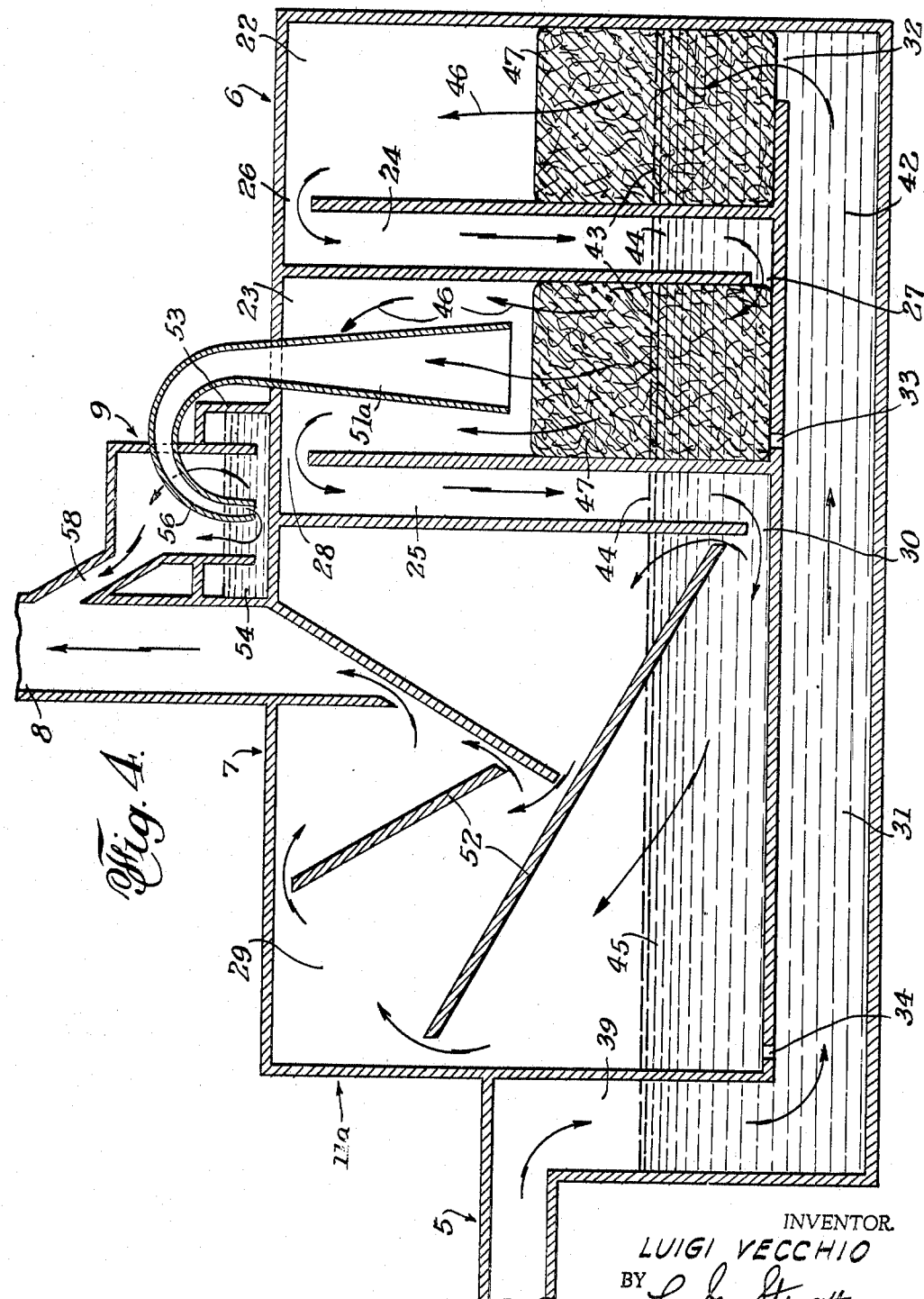
FIG. 4 is a cross-sectional view of a first modification provided with filter packs.
Figure 5:
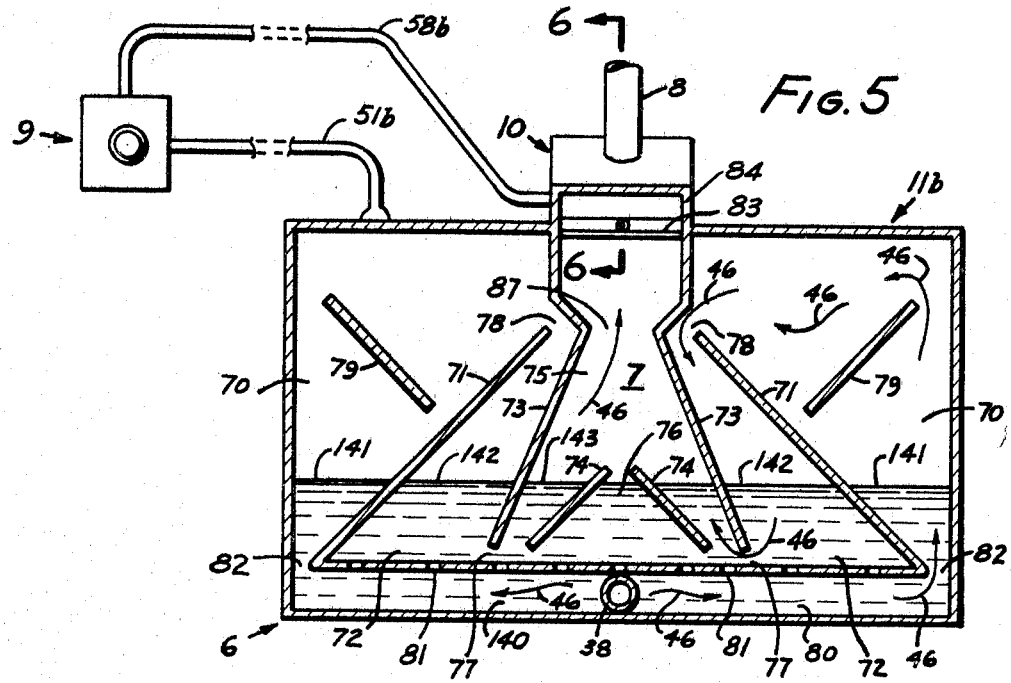
FIG. 5 is a cross-sectional view of a second modification providing means for dividing the fumes into several separate flows and recombining the purified flows into the exhaust section.
Figure 7:
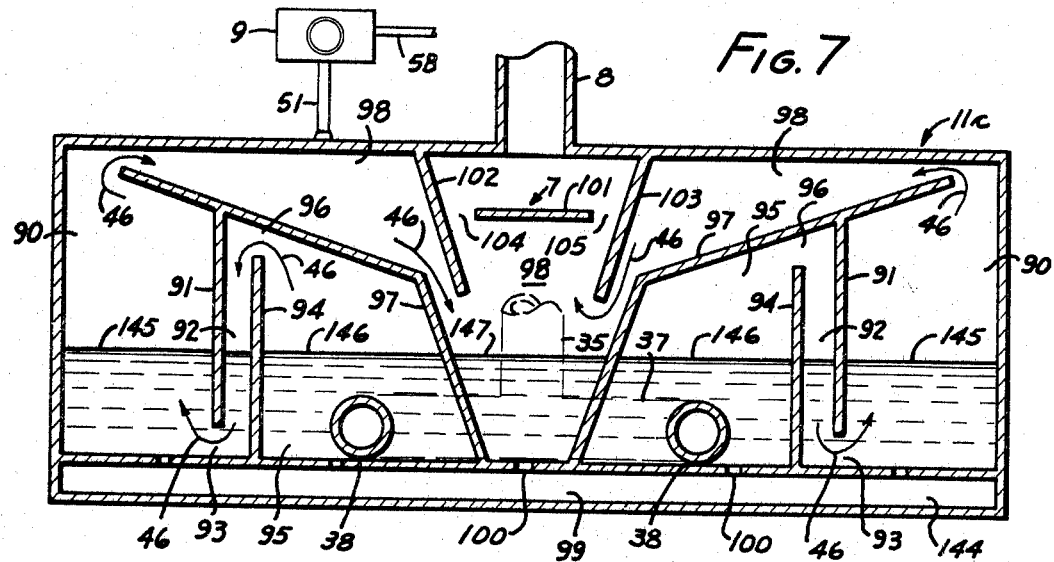
FIG. 7 is a cross-sectional view of a third modification.
Figure 8:
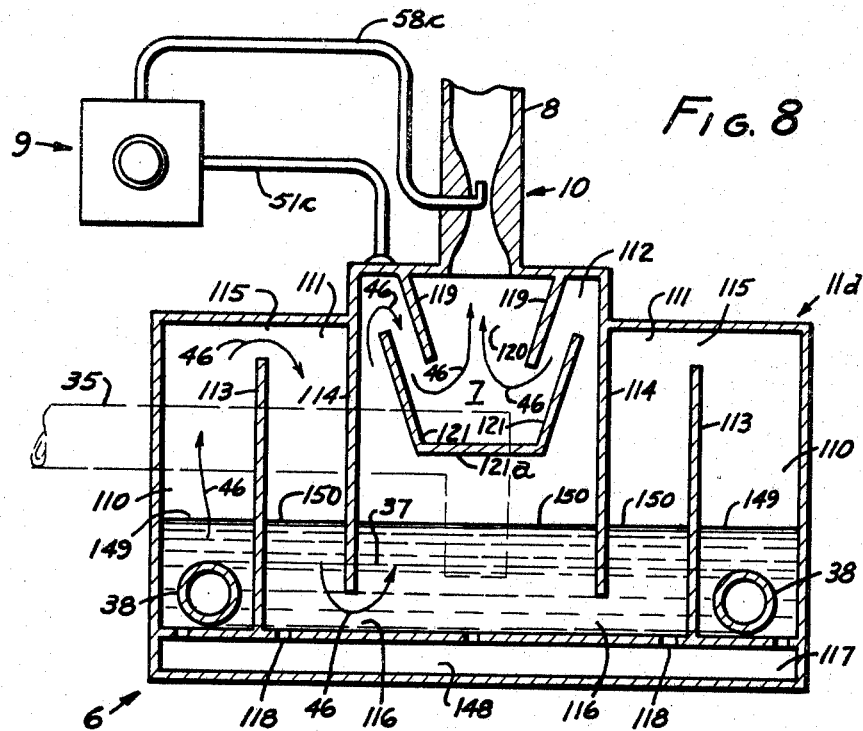
FIG. 8 is a cross-sectional view of a fourth modification which is now the preferred embodiment of this invention.

The means 6 and 7 are shown as being incorporated in a housing 11, in FIGS. 1, 2 and 3, in a housing 11a in FIG. 4, in a housing 11b in FIG. 5, in a housing 11c in FIG. 7, and in a housing 11d in FIG. 8; a portion of the fumes inlet 5 being also incorporated in housing 11a in FIG. 4. The form and proportions of the housing may be varied as desired.

In FIG. 1, housing 11 is shown as being divided by partitions 15 to form end chambers 16 (sometimes hereinafter called "first chambers") and a middle chamber 17 (sometimes hereinafter called "second chamber"), the former being connected to the latter by passages 18 which form the inlet openings to chamber 17 and the outlet openings from chamber 16. In this case, the bottom 19 of the chamber 17 is offset to be above the level of the bottoms 20 of the chambers 16, thereby providing a space 21 beneath the middle chamber 17. In this form of housing, the baffle means 7 is shown as occupying a portion of the chamber 17. Chambers 16 are formed by bottom walls 20, the side and top walls of housing 11, and partitions 15, and chamber 17 is formed by the top of housing 11, bottom wall 19, and partitions 15.

In FIG. 4, the housing 11a is shown as being divided into side-by-side chambers 22 and 23 (sometimes hereinafter called "first chambers") with a vertical passage 24 between said chambers, and a similar passage 25 on the outlet side of the chamber 23. An upper passage 26 connects the chamber 22 and passage 24; a lower passage 27 connects said passage 24 and the chamber 23; and an upper passage 28 connects the chamber 23 and the passage 25.

Said housing 11a further comprises a chamber 29 (sometimes hereinafter called "second chamber") that is connected at its bottom to the bottom of passage 25 by a passage 30. Also, said housing 11a is provided with a chamber 31 below the above-described chambers and passages, a passage 32 connecting the same to the bottom of the chamber 22. Drain holes 33 and 34, respectively, connect the chambers 23 and 29 to the chamber 31.

In FIG. 5, housing 11b is shown as being divided by sloping partitions 73 to form chambers 72 (sometimes hereinafter called "third chambers") and a middle chamber 75 (sometimes hereinafter called "second chamber"), the former being connected to the latter by passages 77 which form the inlet openings to the second chamber 75 and the outlet openings from third chambers 72. End chambers 70 (sometimes hereinafter called "first chambers") are formed by sloping partitions 71, the top of housing 11b, and the end walls of housing 11b; an upper passage 78 connects the chamber 70 and the chamber 72 and forms the outlet from each chamber 70 and the inlet for each chamber 72. In this form of the housing, the baffle means 7 is shown as occupying a portion of the chambers") by partitions 91 and 97 and the end walls of occupying a portion of chamber 70.

Said housing 11b further comprises a chamber 80 that is connected to the bottom of chamber 70 by a passage 82. Drain holes 81 connect the chambers 72 and 75 to the chamber 80.

In FIG. 7 housing 11c is shown as being divided into two end chambers 90 (sometimes hereinafter called "third chambers") by partitions 91 and 97 and the end walls of housing 11c. Chambers 92 are shown connected to chambers 90 by passages 93 and are formed by partitions 91 and 94. Chambers 95 (sometimes hereinafter called "first chamber") are shown communicating with vertical passages 92 by passage 96, and are formed by partition 94 and sloping partition 97. Center chamber 98 (sometimes partition 97 and the top wall of housing 11c. Passages 96 hereinafter called "second chamber") is thus formed by thereby form the outlet from chambers 95 and the inlet to chambers 92, passages 93 form the outlets from chambers 92 and the inlets to chambers 90, and the space between the extreme ends of partitions 97 and the top of the housing 11c form the outlets from chambers 90 and the inlets to chamber 98. In this form of the housing, the baffle means 7 is shown as occupying a portion of chamber 98.

Said housing 11c further comprises a chamber 99 located below the above-described chambers and passages. Drain holes 100 connect the chambers 90, 95 and 98 to the chamber 99.

In FIG. 8, housing 11d is shown as being divided into two end chambers 110 (sometimes hereinafter called "first chambers"), two intermediate chambers 111 (sometimes hereinafter called "third chambers"), and a center chamber 112 (sometimes hereinafter called "second chambers"). Chambers 110 are formed by the end walls of housing 11d and by partitions 113. Chambers 111 are formed by partitions 113 and 114 and, chamber 112 is formed between partitions 114. An upper passage 115 connects chamber 110 to the chamber 111 and forms the outlet from chamber 110 and the inlet for chamber 111, and a lower passage 116 connects the chamber 111 with the center chamber 112 and forms the outlet from chamber 111 and the inlet for chamber 112.

Said housing 11d further comprises a chamber 117 that is located below the above-described chambers and passages. Drain hole 118 connect the chambers 110, 111 and 112 with chamber 117.

The fumes inlet 5 of the embodiments of FIGS. 1, 2, 3, 7 and 8 is shown as a conduit 35 provided with a trap portion 36, and a fumes dividing manifold portion 37 that terminates in a pair of outlet ports 38 that open into the chambers 16 at points intermediate the upper and lower ends of said chambers. In the form of FIG. 4, the fumes inlet 5 is provided with an extension 39 that is coextensive with the lower portion of the chamber 29 and is in communication with the chamber 31. In the embodiment of FIG. 5, the fumes inlet 5 is connected through outlet port 38 that opens into the chamber 80.

In FIGS. 1, 2 and 3, the scrubbing means 6 comprises a liquid bath 40 in each of the chambers 16, and a liquid bath 41 in the chamber 17; in FIG. 4, said means comprises a supply of liquid 42 in chamber 31, liquid baths 43 in chambers 22 and 23, liquid baths 44 in chambers 24 and 25, and a liquid bath 45 in the chamber 29; in FIG. 5, said means comprises a supply of liquid 140 in chamber 80, liquid baths 141 in chambers 70, liquid baths 142 in chambers 72, and a liquid bath 173 in the chamber 75; in FIG. 7, said means comprises a supply of liquid 144 in chamber 99, liquid baths 145 in chambers 90, liquid baths 146 in chambers 95 and a liquid bath 147 in the chamber 98; and in FIG. 8, said means comprises a supply of liquid 148 in chamber 117, and liquid bath 149 in chambers 110 and liquid baths 150 in chambers 111 and 112.

In the embodiment illustrated in FIGS. 1–3, the several chambers are filled, at least to a level above the lower edges of the baffles, with a suitable scrubbing solution or fluid, that may vary according to the use to which the same is put. Except that the liquid is free-flowing, the particular liquid that is employed forms no part of the present invention. Water is effective in scrubbing the exhaust gases from automobile and truck engines.

In all forms of the invention shown, the fumes from the inlet 5, under whatever pressure said inlet is subject to, is forced through the several baths, as shown by the arrows 46, to be scrubbed by the liquid, which cleans said fumes by removing therefrom gaseous contaminants and fine particles. In the embodiments illustrated in FIGS. 1–6, the fumes being scrubbed enter each chamber on one side of the surface of the scrubbing liquid and leave that chamber on the opposite side of the liquid surface. In the embodiments illustrated in FIGS. 7 and 8, the fumes being scrubbed enter the first and third chambers on one side of the liquid surface and leave the chamber on the opposite side. In the embodiments of FIGS. 1–3 and 5–8, the exhaust fumes from the internal combustion engine are divided into substantially equal flow paths before being scrubbed; the scrubbing action taking place in separate scrubbing paths for each divided flow. In FIGS. 1–3, 7 and 8, the dividing occurs in the manifold 37 and the divided flows are introduced into separate scrubbing chambers by ports 38. In FIG. 5, the port 38 introduces the exhaust fumes from the internal combustion engine to a single dividing chamber 80 where the fumes are divided into separate flows to separate scrubbing chambers. It is to be understood that the fumes may be divided into as many flows as desired. The flow paths are recombined in the respective second chambers.

FIG. 4 indicates that the liquid baths may be provided with filter packs 47, as in FIG. 4, which, of course, may be provided in the baths of the other embodiments. Whether these packs are used or not, intercepted matter scrubbed out of the fumes may, in time, clog the scrubbing means to render the same less efficient as fumes clarifiers.

The baffle means 7, as in FIG. 1, comprises sloping walls 48 defining a throat 49 between them; said walls form fumes-guiding member that direct the fumes to said throat. Throat 49 serves to recombine the flows which were divided by manifold 37. If desired, a baffle wall 50 or the like may serve to divide the flow through the means 7, so that most of the flow enters the outlet 8 and a smaller, sample flow enters a conduit 51 that leads to the indicator means 9.

FIG. 4 shows several flow-directing baffle walls 52. In this form, the baffle means 7 is located beyond where the sample flow occurs, the conduit 51a taking the sample of fumes at a point intermediate the baths 43 and 45.

Figure 6:
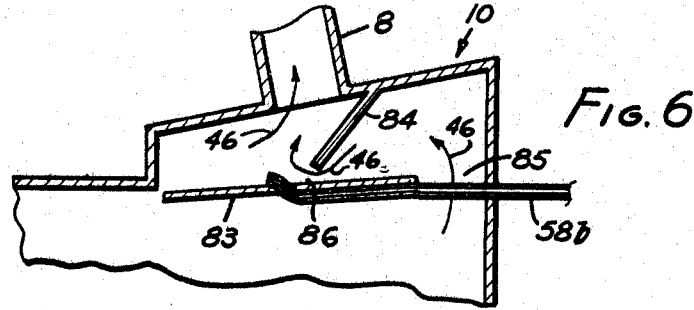
FIG. 6 is a cross-sectional view of the outlet baffle taken along line 6—6 of FIG. 5.

FIG. 5 shows several flow-directing baffle walls 74 and 79. In this form, the baffle means 79 is located before where the sample flow occurs, the conduit 51b taking the sample of fumes at a point intermediate baths 141 and 142. Thus baffle 79 diverts part of the fumes to conduit 51b. Baffle means 74 serves to direct the fumes to a throat 87 formed by baffles 73. An additional throat 86 is formed by baffles 83 and 84 as shown in FIG. 6. Throats 86 and 87 serve to recombine the flows divided by dividing chamber 80.

FIG. 7 shows flow-directing baffles 101, 102 and 103. In this form, the baffles 101, 102 and 103 serve to recombine or mix the flow divided by manifold 37 and the baffle 101 serves to divide the recombined flow through two throats 104 and 105 formed by the passages between baffles 101, 102 and 103.

The baffle means 7, as in FIG. 8, comprises sloping walls 119 defining a throat 120 between them, which serves to recombine the flows divided by manifold 37. As seen in FIG. 8, plates 121 slope in the same direction as plates 119. Plates 121 serve to direct the fumes towards throat 120 and also to prevent excessive escape of the purifying liquids. In addition, plates 121 serve to direct a portion of the fumes to conduit 51c for inspection at means 9. Plate 121a connects plates 121 to each other. Plate 121a does not extend from wall to wall. Instead, there is a gap at both ends, so that gases are baffled by plate 121a, but liquids are not contained above it.

As seen in the embodiments of FIGS. 1–3 and 5–8, provision is made so that the incoming fumes are divided into two or more separate flows with each flow independently being purified and then recombining the purified flows into the exhaust section. In the embodiments of FIGS. 1–3 and FIG. 8 the fumes are introduced into the housing by means of ports 38 located in the end chambers. In the embodiment of FIG. 7 the incoming fumes are introduced through separate ports 38 in intermediate chambers; while in FIG. 5 a single port 38 is located in chamber 80, and there divided into separate flows.

The means 9, whether comprising a unitary part of the housing 11a, as in FIG. 4, or a part that is connected to the housing by a conduit 51, as in FIG. 1, enables visual inspection of the fumes after the same have been scrubbed to thereby determine at what efficiency the scrubbing takes place. The means 9 includes a liquid bath 54 which contains a liquid capable of change in color from clear to dark if noxious fumes are introduced thereto. If the liquid changes from clear to dark, it will be understood that the scrubbing baths have not properly treated the fumes. It may be desirable to effect a direct side-by-side comparison of the fumes, as they enter the device and as the same discharge. A similarity of appearance will show low scrubbing efficiency, or improve efficiency as the discharging fumes lighten. Water may be used in the inspection device, because the impurities will change its color. A wetting agent and an anti-foaming agent may be added, if desired. It is convenient to use the same liquid in both the scrubbing and inspection baths.

In order to make visual inspection of the condition of the fumes effective, the same means 9, as shown in FIG. 1, comprises a housing 53 in which is provided a supply or bath of liquid 54, the level of which may be seen in a glass gauge 55. The conduit 51 is provided with a return bend 56 which may be gradually reduced in size, as shown, the end of said bend extending into the bath 54. Thus, the flow above-mentioned enters said bath and affects the color or clarity thereof according to the treated condition of the fumes, as above discussed. A drain 57 is provided to remove the bath for replacement as needed.

The means 9 that is illustrated is intended as exemplary of fumes-condition-indicating means. Instead of the bath 54, or in addition thereto, the sight glass 5, or an additional glass or window, may expose the flow of fumes after the same have been scrubbed. In any case, the invention contemplates the provision, in a fumes-scrubbing device, of means to inspect the scrubbed means to inspect the scrubbed condition of the fumes as the same are passing to discharge into atmosphere.

A light 65 may be placed in the indicator means 9 so the glass 55 may be easily read, or other indicating means rendered readily visible. In this case, the light is placed within the device, but it may be placed on the outside.

To sum up, the indicator device 9, by displaying in the glass 55 a sample of the solution that is affected by the fumes rising from the chamber 17, visually shows the concentration of materials that are not absorbed in the scrubbing chambers. Thus, the scrubbing efficiency of said chambers is reflected by a change of density or color of the solution in bath 54, such change increasing with time and according to the containment of the fumes, once the concentration exceeds the capability of the solution efficiently to absorb noxious matter.

In cases where the pressure drop between the inlet 5 and the conduit 51 becomes so great as to slow flow through the conduction means 10 and the outlet 58 thereof, a Venturi device 59 may be provided in the outlet 8 to assist in discharge of said outlet 58 to said outlet 8. The Venturi means 59 reduces the pressure on the surface of the bath 54 to cause fumes to flow through the bath, according to the arrows 46, to said outlet.

The outlet baffle shown in FIG. 6, which is used in conjunction with the system shown in FIG. 5, comprises a plate 83 and a sloping plate 84. The outlet 58b from the indicator device 9 is shown passing through plate 83 from the bottom. Thus the majority of the fumes from chamber 75 in FIG. 5 pass through the larger passage 85 in FIG. 6 and through throat 86 formed by plates 83 and 84. Thus, the remote indicator 9 of FIG. 5 examines partially purified gasses from the first chamber 70 and are returned via tube 58b to a below atmospheric pressure in the outlet baffle shown in FIG. 6.

Filling of the various scrubbing baths may be readily accomplished through suitable filler caps, provided for each of the chambers of the device. FIGS. 1, 2 and 3 show piping 60 that, by means of a four-way valve 61 or even by individual valves, may provide for opening all of the chambers 16 and 17 to discharge at 62, connect all of said chambers while the discharge 62 is shut off, or open a selected chamber for discharge while retaining the liquid in the other chambers.

Thus, when the means 9 shows that the fumes have not been properly treated, the bath liquid may be changed, in whole or in part, and the filter cleaned, if the same is used.

It will be understood that the housings are fluid-tight, and that the baffles extend from wall to wall.

I claim:

1. Fumes-scrubbing apparatus for purifying exhaust fumes emanating under pressure from an internal combustion engine comprising: a housing; a plurality of partition means dividing said housing into a plurality of first chambers, a plurality of third chambers, and a second chamber, each of said chambers being constructed and arranged to hold at least one liquid bath therein, said liquid baths being adapted to scrub said fumes and remove objectionable matter therefrom; leveling means adapted to provide a substantially level liquid surface between each of said chambers; a fumes inlet in said housing for admitting exhaust fumes to be purified into said first chambers on one side of the liquid surface therein, said fumes inlet including first dividing means for dividing the exhaust fumes into a plurality of separate paths, each separate path including one of said first chambers, one of said third chambers, and said second chamber, consecutively; an exit opening in each of said first chambers on the opposite side of the liquid surface therein from said fumes inlet; an entrance opening to each of said third chambers in fluid communication with the exit opening of a respective first chamber; an exit opening in each of said third chambers on the opposite side of the liquid surface therein from the entrance opening thereto; an entrance opening to said second chamber in fluid communication with the exit opening to each of said third chambers; throat means formed between a plurality of sloped baffles in said second chamber, said baffles recombining the fumes in said second paths, at least one of said baffles being sloped from the liquid surface to reduce the escape of liquid from said second chamber; and a fumes outlet in fluid communication with said second chamber adjacent to said throat means for releasing the recombined, purified fumes to the atmosphere.

2. Apparatus according to claim 1 wherein each of said third chambers is located at an end of said housing, and said plurality of partition means includes a sloping partition between each of said first chambers and said second chamber, said sloping partitions together forming said throat means.

3. Apparatus according to claim 2 which is further provided with a second dividing means in one of said chambers to divide the scrubbed fumes to form a main flow and a sample flow, an inspection chamber containing an inspection liquid capable of exhibiting an initial color and a second color when it has absorbed impurities, optical means on said inspection chamber for enabling an inspection of the color of the liquid in said inspection chamber, means connected to said second dividing means to carry the sample flow to said inspection chamber, and means connected to the inspection chamber to return the inspected sample fumes to the fumes outlet.

4. Apparatus according to claim 1 wherein said first dividing means comprises a manifold with separate ports in communication with each of said first chambers, and said throat means includes a first pair of sloped plates adjacent to said fumes outlet in said second chamber, a second pair of sloped plates below said first pair of sloped plates and sloped in the same direction as respective ones of said first pair of sloped plates, and a plate extending horizontally between each of said second pair of sloped plates below the first pair of sloped plates.

5. Apparatus according to claim 4 which is further provided with a second dividing means in one of said chambers to divide the scrubbed fumes to form a main flow and a sample flow, an inspection chamber containing an inspection liquid capable of exhibiting an initial color and a second color when it has absorbed impurities, optical means on said inspection chamber for enabling an inspection of the color of the liquid in said inspection chamber, means connected to said second dividing means to carry the sample flow to said inspection chamber, and means connected to the inspection chamber to return the inspected sample fumes to the fumes outlet.

6. Apparatus according to claim 1 wherein said first dividing means comprises a dividing chamber beneath said first, second and third chambers, an exit opening between said dividing chamber and each of said first chambers, said leveling means comprises a plurality of apertures between said dividing chamber and said second and third chambers, each of said first chambers being located at an end of said housing, and said plurality of partition means includes a first sloped partition between each first chamber and a respective third chamber and a second sloped partition between each third chamber and said second chamber, said second sloped partitions together forming a second throat means in said second chamber, the first-recited throat means being disposed between said second throat means and said fumes outlet.

7. Apparatus according to claim 6 which is further provided with a second dividing means in one of said chambers to divide the scrubbed fumes to form a main flow and a sample flow, an inspection chamber containing an inspection liquid capable of exhibiting an initial color and a second color when it has absorbed impurities, optical means on said inspection chamber for enabling an inspection of the color of the liquid in said inspection chamber, means connected to said second dividing means to carry the sample flow to said inspection chamber, and means connected to the inspection chamber to return the inspected sample fumes to the fumes outlet.

8. Apparatus according to claim 1 wherein said throat means is formed between a first sloped baffle and a second sloped baffle disposed below said first sloped baffle, said first sloped baffle being disposed at a greater angle from a horizontal plane than said second sloped baffle, and second throat means in said second chamber between the first-recited throat means and the surface of liquid in the second chamber.

References Cited

UNITED STATES PATENTS

| | | | |
|---|---|---|---|
| 768,369 | 8/1904 | Hunt et al. | 261—22 |
| 1,017,900 | 2/1912 | Phillips. | |
| 1,032,536 | 7/1912 | Gerli et al. | |
| 1,195,315 | 8/1916 | Williams | 261—63 |
| 1,223,953 | 4/1917 | Frisak | 23—254 |
| 1,345,681 | 7/1920 | Kratochvil | 55—248 |
| 1,775,876 | 9/1930 | Vecchio | 55—93 X |
| 1,969,627 | 8/1934 | Simon et al. | |
| 1,994,766 | 3/1935 | Heglar | 55—246 X |
| 2,099,802 | 11/1937 | Ewing. | |
| 2,247,103 | 6/1941 | Summerson | 55—255 |
| 2,527,004 | 10/1950 | Fett | 55—248 |
| 2,612,745 | 11/1952 | Vecchio | 55—257 X |
| 2,653,564 | 9/1953 | Benefield | 116—118 |
| 2,740,491 | 4/1956 | Vecchio | 55—247 |
| 2,853,152 | 9/1958 | Swift | 55—249 |
| 2,911,289 | 11/1959 | Forry. | |
| 3,032,968 | 5/1962 | Novak et al. | |

FOREIGN PATENTS

| | | |
|---|---|---|
| 596,407 | 4/1960 | Canada. |
| 872,532 | 2/1942 | France. |
| 627,057 | 2/1963 | Belgium. |
| 316,594 | 12/1919 | Germany. |

HARRY B. THORNTON, Primary Examiner

D. E. TALBERT, Assistant Examiner

U.S. Cl. X.R.

23—2, 254; 55—234, 246, 248, 256, 257, 270, 274, 419, 434; 60—30; 73—23, 61; 116—118; 261—74, 99, 123

PO-1050
(5/69)

UNITED STATES PATENT OFFICE
CERTIFICATE OF CORRECTION

Patent No. 3,485,015          Dated December 23, 1969

Inventor(s) Luigi Vecchio

It is certified that error appears in the above-identified patent and that said Letters Patent are hereby corrected as shown below:

Column 3, line 30 should read --chamber 75; an additional sloping baffle 79 is shown as--

Column 3, line 42, "chamber" should read --chambers--

Column 3, lines 44 and 45 should read --hereinafter called called "second chamber") is thus formed by partition 97 and the top wall of housing 11c Passages 96--

Column 3, line 50, delete "the" (first occurrence)

Column 4, line 52, "paths" should read --baths--

Column 4, line 71, "member" should read --members--

Column 5, line 59, "improve" should read --improved--

SIGNED AND
SEALED
NOV 3 1970

(SEAL)
Attest:

Edward M. Fletcher, Jr.
Attesting Officer

WILLIAM E. SCHUYLER, JR.
Commissioner of Patents